United States Patent [19]  
Kawase et al.

[11] Patent Number: 4,963,230  
[45] Date of Patent: Oct. 16, 1990

[54] AGRICULTURAL PAPER AND PROCESS FOR PRODUCING THE SAME

[75] Inventors: Mitsuru Kawase, Sapporo; Masashi Tanimura; Hidekazu Terasawa, both of Obihiro; Sohei Nakamura; Takayuki Nagano, both of Ebetsu; Shosuke Higashimori, Okayama; Hiroshi Matsuki, Okayama; Hisashi Matsumoto, Okayama, all of Japan

[73] Assignees: Oji Paper Company Ltd.; Kuraray Co., Ltd.; Nihon Tensaiseito Kabushiki Kaisha, all of Japan

[21] Appl. No.: 374,565

[22] Filed: Jul. 5, 1989

Related U.S. Application Data

[63] Continuation of Ser. No. 74,713, Jul. 17, 1987, abandoned.

[30] Foreign Application Priority Data

Jul. 29, 1986 [JP] Japan ................................ 61-176757  
Jul. 30, 1986 [JP] Japan ................................ 61-181155

[51] Int. Cl.$^5$ ............................................. D21F 11/00  
[52] U.S. Cl. ..................................... 162/129; 162/123; 162/125; 162/132; 162/133; 162/146; 47/73; 47/74; 47/77  
[58] Field of Search ............... 162/231, 129, 146, 123, 162/125, 132, 133, 206, 157.3; 47/74, 73, 77

[56] References Cited

U.S. PATENT DOCUMENTS 3,953,642 4/1976 Forbess et al. ................. 162/129 X  
4,096,313 6/1978 Fujita et al. ........................... 428/304  
4,231,186 11/1980 Ruuska ................................... 42/74  
4,477,516 10/1984 Sugihara et al. ..................... 428/296

FOREIGN PATENT DOCUMENTS 0082653 6/1983 European Pat. Off. .

OTHER PUBLICATIONS

Testing Method for Tensile Strength of Paper and Paperboard JIS-P-8113-1976, 1980 Tappi International Symposium on Synthetic Pulps and Papers.

Primary Examiner—David Simmons  
Assistant Examiner—Thi Dang  
Attorney, Agent, or Firm—Oliff & Berridge

[57] ABSTRACT

Disclosed herein is agricultural paper to be made into pots for raising seedlings. It is made up of a first layer made chiefly of natural pulp and a second layer made of synthetic fibers having a basis weight of 3–15 g/m$^2$, said first layer and second layer being joined to each other by the wet papermaking process which intertwines the fibers of the two layers at their joining interface. The second layer is formed by fusion bonding composite synthetic fibers of polymers having different plasticizing temperatures.

14 Claims, 2 Drawing Sheets

AGRICULTURAL PAPER AND PROCESS FOR PRODUCING THE SAME

This is a continuation of application Ser. No. 07/074,713 filed Jul. 17, 1987, now abandoned.

BACKGROUND OF THE INVENTION

1. Field of the Invention

The present invention relates to agricultural paper and also to a process for producing the same. More particularly, it relates to paper suitable for the production of pots for raising seedlings and also to a process for producing the same. The pots made from the agriculatural paper of the invention permits the seedlings to take root through the wall of the pots after the seedlings are transplanted to the field together with the pots.

2. Description of the Prior Art

It has been common practice to raise seedlings in paper pots and transplant the raised seedlings to the field together with the pots. This cultivation method saves labor and increases the yield of crops.

The paper pot to be used as mentioned above should ideally have the following characteristic properties: (1) Air and water permeability necessary for the growth of seedlings; (2) Adequate separation between pots so as to prevent the roots of seedlings in adjacent pots from getting entangled together in the period of raising seedlings; (3) Strength and stiffness of sufficient paper to hold seedlings and soil in the pot while transplantation is being carried out; (4) Ability to resist rotting caused by various types of soil in the period of raising seedlings; and (5) Structure that permits the roots of crops to penetrate the pot wall after transplanation. In addition, the paper pots should be inexpensive because they cannot be recovered for reuse after transplantation.

To meet the above-mentioned requirements, there have been proposed various kinds of agricultural paper. For example, Japanese Patent Laid-open No. 150249/1977 discloses agricultural paper composed of special paper or paperboard and nonwoven fabric bonded to both sides thereof with a paste or by the other means, said paper or paperboard rotting or decomposing in soil. The nonwoven fabric is made of synthetic fiber, rots slowly in soil, and has a highly porous reticulated structure. Japanese Patent Laid-open No. 26118/1981 discloses agricultural paper composed of first and second thin films bonded to each other with a water-soluble paste, said second thin film being resistant to rotting and porous enough for radicles to penetrate. Japanese Patent Laid-open No. 109524/1981 discloses agricultural paper composed of paper of natural fiber and synthetic fibers uniformly dispersed thereon and bonded thereto, the amount of said synthetic fiber being 5–20 g/m². Japanese Patent Laid-open No. 60919/1983 discloses agricultural paper composed of paper of natural fiber and a thin film of composite synthetic fibers (less than 15 g/m²) bonded to each other, said composite synthetic fiber being composed of a core made of a synthetic resin having a higher melting point and a sheath made of a synthetic resin having a lower melting point.

In the case of the conventional two- or three-layered agricultural paper as mentioned above, the layer of synthetic fiber should be as the thin and porous as possible so that it permits the growth of radicles when the paper layer made of natural pulp has rotted after transplantation. However, according to the conventional technology, it is very difficult to produce a uniform, porous, thin film having a basis weight lower than 10 g/m². It is also difficult to uniformly bond such a thin film to the paper layer made of natural pulp. Therefore, the conventional agricultural paper was inevitably expensive.

Another disadvantage of the conventional agricultural paper is that the paper layer made of natural pulp and the layer of artificial or synthetic thin film separate easily from each other on contact with water in the period of raising seedlings, if the two layers are bonded with a paste. When the two layers are separated from each other, the pot does not hold the soil and seedlings completely during transplantation by a machine. This cause problems in the transplantation.

SUMMARY OF THE INVENTION

It is an object of the present invention to provide agriculatural paper of a new type which is inexpensive and yet superior in performance. It retains its sufficient paper strength and yet permits the growth of radicles after transplantation. These merits comes from the use of a nonwoven fabric of low basis weight made of synthetic fibers.

It is another object of the present invention to provide a process for producing such agricultural paper.

The first agricultural paper of the present invention is made up of a first layer made chiefly of natural pulp and a second layer made of synthetic fibers having a basis weight of 3–15 g/m², said first layer and second layer being joined to each other by the wet papermaking process which interwines the fibers of the two layers at their joining interface.

The second agricultural paper of the present invention is made up of a first layer made chiefly of natural pulp and a second layer of synthetic fibers having a basis weight of 3–10 g/m², said first layer and second layer being bonded to each other by the papermaking process, said first and second layers having a total basis weight of 40–100 g/m², said second layer forming a reticulated structure and being composed of (a) thermoplastic fibers and (b) a polymer having a plasticizing temperature (referred to as a melting point hereinafter) lower than that of said thermoplastic fibers, said polymer being present on the surface of said thermoplastic fibers and bonding and fixing the thermoplastic fibers, bonding and fixing the natural pulp intertwining with said thermoplastic fibers (a) at the interface between the two layers.

The agricultural paper of the present invention is produced by forming a first layer, which is wet paper of natural pulp, by the papermaking process and forming a second layer of synthetic fibers on said first layer by the wet papermaking process, and subsequently drying the joined two layers. The dried product may be further heated, if necessary.

In the present invention, the basis weight (g/m²) of the second layer composed of synthetic fibers means the weight of synthetic fibers alone, and the total basis weight of the first and second layers means the weight of fibers forming the first and second layers. For example, in the case where the first layer is made of natural pulp (a), and the second layer is made of synthetic fibers (b) and a small amount of natural pulp (c), the total basis weight of the first and second layers is the sum of (a), (b), and (c).

The natural pulp constituting the first layer is not specifically limited. It may be any natural pulp for papermaking, which includes wood pulp such as hardwood pulp and softwood pulp, rag pulp, waste paper pulp, and bagasse pulp.

The natural pulp is not specifically limited in beating degree either. However, the preferred beating degree is such that the radicles do not interwine the paper while the seedlings are being raised and yet the paper retains a certain amount of stiffness at the time of transplantation. The preferred beating degree may be expressed in terms of Canadian standard freeness (referred to as C.S.F. hereinafter) in the range of 500 to 700 cc. The basis weight of the first layer is higher than 40 g/m$^2$, and usually 50–60 g/m$^2$.

In the case of the first agricultural paper, the synthetic fibers constituting the second layer are not specifically limited so long as they have corrosion resistance. Examples of the synthetic fibers that can be used include polyvinyl alcohol fiber, polypropylene fiber, polyethylene fiber, polyolefin fiber, polyester fiber, polyamide fiber, polyacrylonitrile fiber, and polyvinyl chloride fiber.

The synthetic fibers may be treated with a surface active agent to improve dispersion in water and hydrophilic nature. In addition, the synthetic fibers may be used in combination with dispersing agent such as polyethylene oxide, sodium polyacrylate, sodium tripolyphosphate, polyacrylamidde, and polyethyleneimine. The synthetic fibers may also be used in combination with self-adhering synthetic fibers or polyvinyl alcohol fibers which function as a binder when subjected to a wet sheet upon heat. These fibers exhibit adhesive properties upon heating with a dryer or upon heating and pressing with heat roll. The bonding of the synthetic fibers may also be accomplished by applying the above-mentioned binder in powder form or a water-resistant binder of PVA, acrylic resin, or vinyl acetate in liquid (latex) form. The application of the binder may be accomplished by spraying, dipping, or coating during or after papermaking process.

In the case of the second agricultural paper of the present invention, the second layer is made of so-called composite fibers made of two or more kinds of thermoplastic resins which differ in melting point. (The composite fibers include blended fibers.) The form of the composite fibers is not specifically limited. It may be of side-by-side type, sheath-core type, or matrix-fibril type with, e.g., numerous island-in a sea type. The composite fiber should be constructed such that the polymer having the lowest melting point constitutes at least a part of the surface of the composite fiber. This is necessary for the fibers to form the reticulated structure through fusion bonding at their contact points and to provide sufficient paper strength. For example, in the case of composite fiber of sheath-core type or numerous island-in a sea type, the polymer out of which the sheath or sea component made should have the lower melting point,. Examples of the composite fibers that can be used in the present invention include polyolefin composite fiber of side-by-side type and sheath-core type and polyester composite fiber of sheath-core type which are commercially availability. Another example is disclosed in Japanese Patent Laid-open No. 39412/1985. The composite fiber used in the present invention is cut to a proper length in the range of 100 to 1500 in terms of aspect ratio (defined as a ratio of the length of the fiber to the diameter of a circle having an area corresponding to the sectional area of the fiber).

In the case of the second agricultural paper of the present invention, the second layer should have the following characteristic properties. That is, it should provide sufficient paper strength that it permits transplantation after the raising of seedlings and yet it should have as low a basis weight as possible so that it has a coarse reticulated structure that permits the free growth of radicles. These contradictory requirements are satisfied by using the above-mentioned composite fibers which form the reticulated structure through firm bonding at their contact points while retaining their strength.

The first agricultural paper of the present invention is suitable for making pots for raising seedlings for tap root crops (exemplified by sugar beet) and for lateral root crops (exemplified by vegetable crops and pulse crops). For the latter application, the corrosion resistant fiber constituting the second layer should have a fineness of 3 denier or up and the basis weight of the fiber should be lower than 10 g/m$^2$ so that the second layer forms a coarse reticulated structure that permits the free growth of lateral roots.

In the case of the first agricultural paper of the present invention, the basis weight of the second layer of synthetic fiber should be 3 to 15 g/m$^2$, preferably 5 to 12 g/m$^2$. With a basis weight lower than 3 g/m$^2$, the resulting agricultural paper lacks adequate paper strength and stiffness. Conversely, with a basis weight higher than 15 g/m$^2$, the resulting agricultural paper is not only expensive but also prevents the growth of radicles after transplantation.

The synthetic fiber for the second layer should have a fineness greater than 3 denier where the agricultural paper is made into pots for lateral root crops; however, it is not specifically limited in fineness so long as it can be handled by a papermaking process where the agricultural paper is made into pots for tap roots crops.

In the case of the second agricultural paper of the present invention, the basis weight of the second layer should be 3 to 10 g/m$^2$. With a basis weight lower than 3 g/m$^2$, the resulting agricultural paper lacks adequate paper strength and stiffness. Conversely, with a basis weight higher than 10 g/m$^2$, the resulting agricultural paper is not only expensive but also prevents the growth of radicles after transplantation. The composite synthetic fiber for the second layer should have a fineness greater than 3 deniër where the agricultural paper is made into pots for lateral root crops; however, it is not specifically limited in fineness so long as it can be handled by a papermaking process where the agricultural paper is made into pots for tap root crops.

The agricultural paper of the invention is produced from the above-mentioned paper stuff by the wet papermaking process. A papermaking machine of any type can be used so long as it is capable of joining two or more sheets together, and papermaking may be accomplished by the usual combination process. The first layer may be produced from natural pulp, size, reinforcing agent, and a small amount of other papermaking fibers. The synthetic fibers are made into the second layer after complete dispersion. The first layer and second layer are placed one over the other while they are still wet, so that the fibers of natural pulp and the synthetic fibers are interwined with one another at the interface of the two layers. This structure is one of the features of the present invention. The thus formed two layers do not separate from each other after the raising of seedling. In the case of the second agricultural paper, the two layers placed one over the other are dried and then heated. The heating temperature is important for the composite fibers constituting the second layers to form the reticulated structure of desired performance. In other words, the heating temperature should be intermediate between the highest melting point and the lowest melting point of the two or more polymer components constituting the composite fiber. Upon heating at such a temperature, one of the polymer components which has the lowest melting point and constitutes at least a part of the surface of the composite synthetic fiber melts, firmly bonding the contact points, without damaging the fibrous structure of the other polymer component having a higher melting point. In this way, the second layer of reticulated strcuture which provides high paper strenth is formed.

If the heating temperature is lower than the above-mentioned lowest melting point, the bonding at the contact points does not take place; conversely if the heating temperature is higher than the highest melting point, all the fibrous structure of the polymer constituent is destroyed, with the result that sufficient paper strength is not obtained.

In the agricultural paper of the invention, the outstanding characteristic properties of synthetic fibers are effectively used to obtain the characteristic properties required for the reticulated structure in the second layer, as mentioned above. The indispensable factor required for the second layer is formation or uniformity. To meet this requirement a wet papermaking process. However, it is impossible to produce the second layer of low basis weight from synthetic fiber alone at a low cost even though the wet papermaking process is employed. In the present invention, it was achieved by joining the second layer with the first layer made chiefly of natural pulp in the papermaking process. The natural pulp is capable of rotting while raising seedlings and following transplantation.

Joining wet sheets is a well-known papermaking process. Conventionally, it is intended to produce decorative paper or to improve the uniformity or processability of compsite paper, and it has never been used for the production of composite paper as in the present invention. In the present invention, it is used to produce agricultural paper of high performance. In the words, it is used to join a layer of synthetic fibers with a layer of natural pulp, the former having high paper strength with an extremely low basis weight and the latter being expected to rot in soil.

In the case of the second agricultural paper of the present invention, the synthetic fibers may not provide the best formation because they are originally hydrophobic, have higher finess than ordinary ones for papermaking, and are made into the second layer having a very low basis weight. (Where the agricultural paper is intended for pots for lateral root crops, thick synthetic fibers are used for the second layer.)

In such a case, it is desirable to add a small amount of natural pulp to the synthetic fibers to improve the papermaking performance. Mixing composite fibers with natural pulp which does not undergo fusion bonding has been considered to be undesirable because the adhesion between composite fiber and natural pulp is lower than the adhesion of composite fibers with one another and also because the natural pulp mixed with composite fibers rots in soil, reducing the paper strength.

The present inventors carried out extensive studies on the paper strength and papermaking performance of the second layer used in the agricultural paper of the present invention. It was found, as expected, that the paper strength is poor when the synthetic fiber is thin, but it was unexpectedly found that the paper strength does not decrease even when the synthetic fiber is mixed with up to 300 wt% of natural pulp if the synthetic fiber is thicker than 3 denier and the basis weight of the second layer is as specified in the invention. It was also found that the paper strength reaches a maximum when the amount of natural pulp mixed is about 100 wt%. This suggests that there exists a certain region in which the increase of paper strength of the second layer which is achieved by the addition of natural pulp exceeds the decrease of paper strength caused by the hindrance by natural pulp to bonding of synthetic fibers. The reason why the paper strength reaches maximum when natural pulp is added in an amount more than expected is considered as follows: The thick synthetic fibers at an extremely low basis weight form a coarse reticulation, and the fine natural pulp fills the voids in the reticulation during the papermaking process. Thus the synthetic fibers are well dispersed and yet the amount of natural pulp existing among synthetic fibers does not have as great an effect on paper as would be expected.

DETAILED DESCRIPTION OF THE INVENTION

Figure 1:
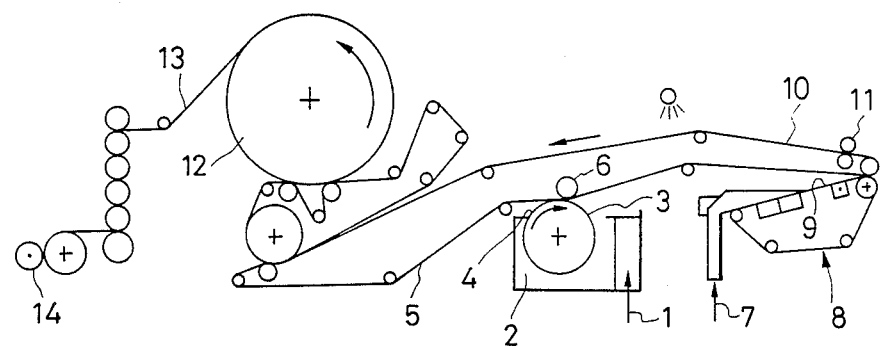
FIG. 1 is a schematic representation showing one example of the process for producing the agricultural paper of the invention.

The agricultural paper of the present invention is produced by using a combination machine as schematically shown in FIG. 1. The combination machine joins wet sheets by using a cylinder mold and an inclined wire cloth.

The paper stock is introduced into the vat 2 through the inlet 1. The natural fibers dispersed in water in the vat 2 collect on the cylinder mold 3, forming the wet paper layer 4. The wet paper layer 4 is picked up by the felt 5 and squeezed by the press roll 6. On the other hand, the synthetic fibers are fed through the inlet 7, and they are formed into the synthetic fiber layer 9 on the inclined wire cloth 8. The synthetic fiber layer 9 is picked up on the wet paper of natural fiber 4 being carried by the felt. Upon compression by the press roll 11, they form joined layer 10. The joined layer 10 is dried by the drier 12. The resulting product is the lined paper 13, which is subsequently wound up onto the pope reel. Thus there is obtained the roll paper 14.

DESCRIPTION OF THE PREFERRED EMBODIMENTS

Example 1

The agricultural paper of the present invention was produced using the papermaking machine as shown in FIG. 1. A pulp layer having a dry basis weight of 60 g/m² was produced from wood pulp (NUKP) having a C.S.F. of 570 cc. This pulp layer was joined with a synthetic fiber layer of varied basis weight (2, 3, 5, 10, 15, 20, 25, and 30 g/m²). The synthetic fiber layer was produced, using an inclined wire cloth, from 3-denier polyethylene fiber, 30 mm long, dispersed into water at a concentration of 0.02 wt% with the aid of polyethylene oxide (dispersing agent). After dehydration by pressing, the lined paper was dried by a drier at 120° C. and wound up. The papermaking speed was 500 m/min.

Figure 2:
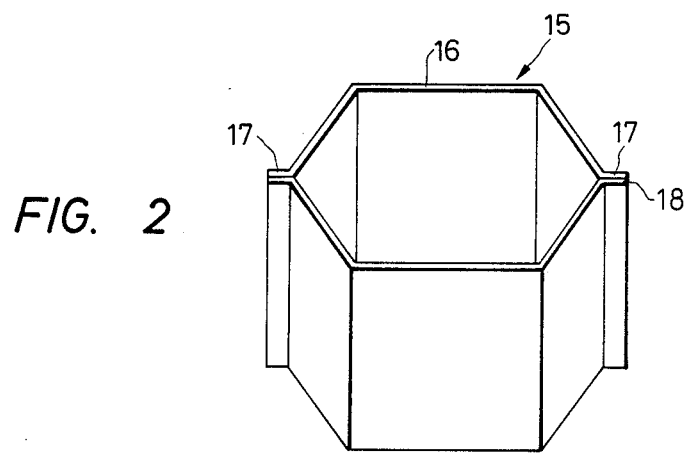
FIG. 2 is a perspective view showing one example of a pot for raising seedlings made of the agricultural paper of the invention.
Figure 3:
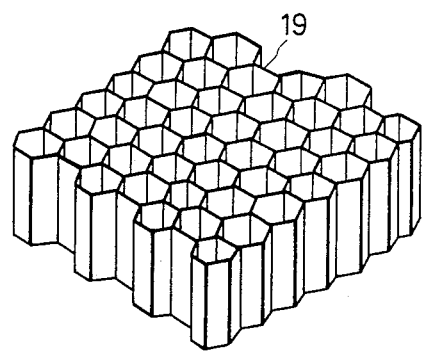
FIG. 3 is a perspective view showing one example of an aggregate of pots of the type shown in FIG. 2.
Figure 4:
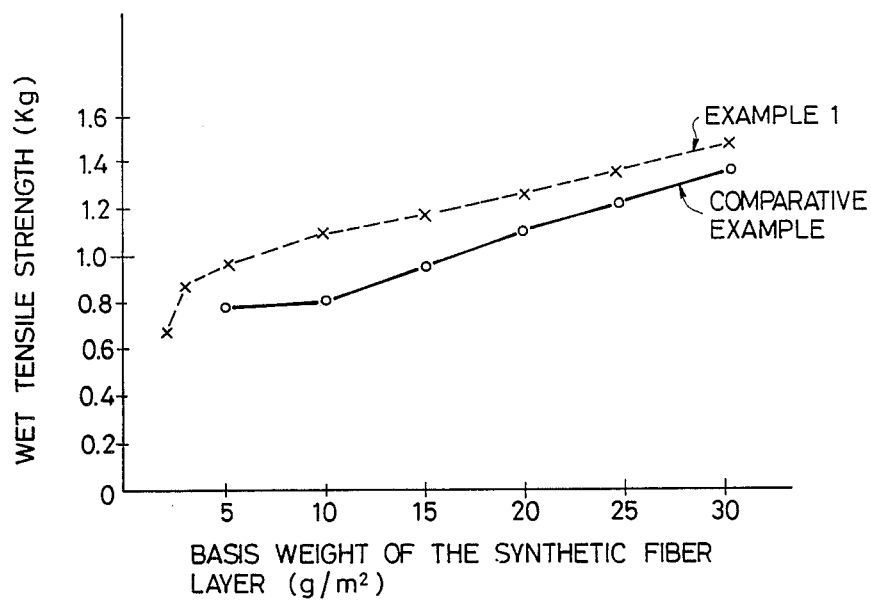
FIG. 4 is a graph showing the relationship between the basis weight of the synthetic fiber layer and the wet strength of the agricultural papers of the present invention and the comparative Example.
Figure 5:
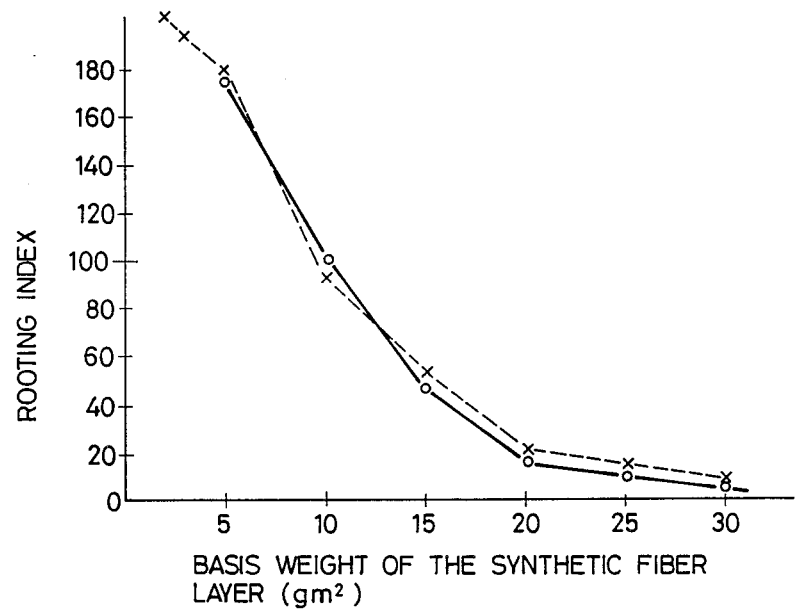
FIG. 5 is a graph showing the relationship between the basis weight of the synthetic fiber layer and the rooting index of the present invention and the comparative Example.

The thus produced eight kinds of paper (with varied basis weight of synthetic fiber layer) were made into bottomless pots 15, with the synthetic fiber layer 16 inside, as shown in FIG. 2. The pot has a hexagonal pillar-like shape, 5 cm in diameter and 5 cm high. The edges 17 were bonded together with a water-resistant adhesive or by fusion bonding. Thus the water-resistant bonded part 18 was formed. A large number of the pots 15 were bonded together with a water soluble adhesive to form the aggregate pots 19 as shown in FIG. 3. Cabbage seeds were sown in the usual way. Seedlings were raised with proper care such as watering for 28 days. The pots of seedlings were separated from one another and transplanted to the field. Each pot retained its shape until transplantation without delamination taking place between the pulp layer and the synthetic fiber layer. On the 30th day after transplantation, the state of rooting was examined. The paper strength after the raising of seedlings and the state of rooting at the 30th day after transplantation are shown in FIGS. 4 and 5, respectively. (The wet tensile strength (kg/60 mm) was measured according to the method used for measuring the strength after burying.)

In Comparative Example 1, the same experiment as mentioned above was carried out using pots produced in the following manner. The wet paper 4 formed by the cylinder mold 3 was dehydrated by the press roll 11 and then dried by the drier 12 to give paper of natural pulp having a basis weight of 60 g/m². On this paper were uniformly scattered polyethylene short fibers (having the same fineness and length as mentioned above) so that basis weights of 5, 10, 15, 20, 25, and 30 g/m² were achieved. Basis Weights of 2 and 3 g/m² were technically impossible to achieve.) The scattered polyethylene short fibers were fusion bonded to the paper. The thus produced agricultural paper was made into pots as mentioned above and the pots were used for raising cabbage seedlings. The paper strength and the state of rooting examined in the same manner as in Example 1 after the raising of seedlings are shown in FIGS. 4 and 5, respectively.

As FIGS. 4 and 5 show, there is no difference in the rooting index between Example 1 and Comparative Example 1. However, regarding the paper strength after the raising of seedling, the agricultural paper in Example 1 is superior to the that in Comparative Example 1. This result indicates the uniform dispersion of both natural pulp and synthetic fibers in the agricultural paper of the present invention. Incidentally, the rooting index is designated as 100 for the number of roots which penetrated the pot made of the agricultural paper lined with a synthetic fiber layer having a basis weight of 10 g/m².

Example 2

The synthetic fiber layer having a dry basis weight of 6 g/m² was produced in the same manner as in Example 1 from a mixture composed of polyvinyl alcohol fibers (1 denier × 15 mm long) and polyethylene fibers (3 denier × 7 mm long). The wet sheet of synthetic fiber was joined with a wet sheet of kraft pulp of Example 1, followed by drying and winding in the same manner as in Example 1. The dried paper was passed through heated calendar rolls and then cooled and wound at a rate of 300 m/min. Thus there was obtained the agricultural paper of the invention. This paper was made into pots in the same manner as in Example 1 and the pots were used for raising cabbage seedlings. The pots had a high wet strength after the raising of seedlings. They had also good handling properties and permitted smooth lateral rooting after transplantation.

Example 3

Agricultural paper of the invention was produced in the same manner as in Example 1 except that the dry basis weight of kraft pulp paper was 50 g/m² and the synthetic fiber having a dry basis weight of 8 g/m² and the synthetic fiber layer having a dry basis weight of 8 g/m² was made from a 50:50 (by weight) mixture of polyvinyl alcohol fibers (2 denier × 15 mm long) and polyvinyl alcohol-based fibrous binder (1 denier × 7 mm long).

The agricultural paper was made into pots of hexagonal pillar-like shape. The pots were used for raising and transplantation cabbage seedlings.

In Comparative Example 2, the wet paper layer of kraft pulp 4 formed by the cylinder mold 3 was dehydrated by the press roll 11 and then dried by the drier 12 to give paper having a basis weight of 50 g/m². On this paper were uniformly scattered polyvinyl alcohol fibers (2 denier × 15 mm long) so that a basis weight of 8 g/m² was achieved. The scattered polyvinyl alcohol fibers were fusion bonded to the paper.

In Comparative Example 3, agricultural paper was produced in the same manner as mentioned above except that the kraft pulp was replaced by a paper stock composed of kraft pulp and 18 wt% of polyvinyl alcohol fiber (2 denier × 7 mm long).

The thus produced agricultural paper was made into pots as mentioned above and the pots were used for raising and transplanting cabbage seedlings.

On the 3rd, 5th, and 7th days after transplantation, the number of roots which had penetrated the pot was counted. The results are shown in Table 1. (Incidentally, the pots in Comparative Examples were poor in strength with delamination after transplantation, and they were also poor in handling properties.)

TABLE 1

| After transplantation | 3rd day | 5th day | 7th day |
|---|---|---|---|
| Example 3 | 17 | 35 | 65 |
| Comparative Example 2 | 15 | 32 | 68 |
| Comparative Example 3 | 0 | 3 | 12 |

Example 4

Agricultural paper of the invention was produced using a combination machine having two cylinder molds and a Yankee dryer. The wet paper layer having a dry basis weight of 50 g/m² was formed using the first cylinder mold from softwood kraft pulp having a C.S.F. of 530 cc. The wet synthetic fiber layer having a basis weight of 5 g/m² was formed using the second cylinder mold from a mixture (paper stock) composed of 75% of polyvinyl alcohol fibers (1 denier×7 mm long) and 25 wt. % of polyvinyl alcohol-based fibrous binder (1 denier×3 mm long). The two layers were joined together, followed by dehyderation by a pressing roll and drying by a Yankee roll at a surface temperature of 110° C.

The wet strength (strength after burying) of the thus produced agricultural paper was measured. The results are shown in Table 3. The strength after burying was measured in the following manner. The sample is buried in soil containing 33 wt. % of water in an environment at 30° C. and 95% RH for 14 days. After removal from soil, a test specimen 60 mm wide is cut out of the sample. The test specimen is folded in quarter along the lengthwise direction. The strength of the test specimen, with a sample length being 5 cm, is measured according to JIS P-8113.

Example 5

Agricultural paper of the invention was produced in the same manner as in Example 4 except that the synthetic fiber layer having a dry basis weight of 6 g/m² was formed from a mixture (paper stock) composed of 40 wt. % of polyester synthetic fiber (1.5 denier×5 mm long), 20 wt. % of polyvinyl alcohol fiber (0.5 denier×3 mm long), and 40 wt. % of polyvinyl alcohol-based fibrous binder (0.5 denier×3 mm long), and the pulp layer having a dry basis weight of 55 g/m² was formed from kraft pulp having a C.S.F. of 570 cc. The agricultural paper was examined for strength after burying in the same manner as in Example 4. The results are shown in Table 3.

Comparative Examples 4 to 6

Paper having a dry basis weight of 60 g/m² was made using the same first cylinger mold as used in Example 4 from the same kraft pulp, polyvinyl alcohol fibers, and polyvinyl alcohol-based fibrous binder as used in Example 4. The formulation of these components is shown in Table 2. The paper samples were examined for strength after burying in the same manner as in Example 4. The results are shown in Table 3.

TABLE 2

| Comparative Example | Kraft pulp | Polyvinyl alcohol synthetic fiber | Polyvinyl alcohol-based binder |
| --- | --- | --- | --- |
| Comparative Example 4 | 90.0 | 7.5 | 2.5 |
| Comparative Example 5 | 80.0 | 15.0 | 5.0 |
| Comparative Example 6 | 70.0 | 22.5 | 7.5 |

TABLE 3

| Example No. | Strength after burying (kg/60 mm) | Content of synthetic fiber and fibrous binder (wt %) |
| --- | --- | --- |
| Example 4 | 0.72 | 9.1 |
| Example 5 | 0.68 | 9.8 |
| Comparative Example 4 | 0.27 | 10.0 |

TABLE 3-continued

| Example No. | Strength after burying (kg/60 mm) | Content of synthetic fiber and fibrous binder (wt %) |
| --- | --- | --- |
| Comparative Example 5 | 0.54 | 20.0 |
| Comparative Example 6 | 0.75 | 30.0 |

It is noted from Table 3 that the agricultural paper in Example 4 and 5 meets the requirement for strength after burying (0.5 kg/60 mm) although the content of synthetic fibers is much less than that in the conventional kraft paper incorporated with synthetic fibers.

Example 6

Agriculture paper of the present invention was produced in the same manner as in Example 3 except that the kraft pulp was incorporatede with 1-5 wt. % of anticeptic agent (copper complex). This agricultural paper was made into pots as in Example 1 and the pots were used for raising and transplanting cabbage seedlings. The disintegration of the natural pulp layer was slower than the paper in Example 3. As a result, the pots retained sufficient strength and provided good handling properties at the time of transplantation. No adverse effect on rooting was observed.

Example 7

The procedure in Examples 2 and 3 were repeated except that the kraft pulp layer was incorporated with 2.0 wt. % of urea or ammonium sulfate. The thus obtained agricultural paper of the present invention was made into pots in the same manner as in Example 1, and the pots were used for raising and transplanting cabbage seedlings. With these pots, the number of days until transplantation was reduced by about 10% and the growth after transplantation was better than in Examples 2 and 3.

Example 8

Agricultural paper of the present invention was produced using a combination machine provided with two cylinder molds. The first layer was made from NUKP having a C.S.F. of 550 cc. The second layer was made from sheath-core type composite synthetic fiber incorporated with the same natural pulp as used for the first layer. The composition fiber is 4 denier in fineness and 10 mm long, with the aspect ratio being 500. The sheath was made of polyethylene terephthalate copolymer having a melting point of 110° C. and the core was made of polyethylene terephthalate having a melting point higher than 200° C. After joining, the first and second layers the paper was dried by a Yankee dryer at a surface temperature of 110° C. and then heated by multiroll heat rolls at a surface temperature of 140° C. The basis weight of the synthetic fiber in the second layer was 5 g/m², and the amount of natural pulp added in the second layer was varied in the range of 0-400 wt. %. The basis weight of the first layer was changed according to the mixing ratio of natural pulp in the second layer, so that the total basis weight was 60 g/m². To see the paper strength after seedling raising, the agricultural paper was examined for stregth afte burying in the same manner as in Example 4. The results are shown in Table 4.

TABLE 4

| Mixing ratio of natural pulp in the second layer (wt. % based on composite synthetic fiber) | 0 | 5 | 10 | 20 | 50 | 100 | 200 | 300 | 400 |
|---|---|---|---|---|---|---|---|---|---|
| Strength after burying (kg/60 mm) | 1.30 | 1.33 | 1.35 | 1.41 | 1.50 | 1.62 | 1.49 | 1.34 | 0.83 |

Example 9

Agricultural paper of the present invention was produced in the same manner as in Example 8 except that the first layer was made from NUKP having a C.S.F. of 550 cc, and the second layer was made from numerous island in a sea type composite synthetic fiber as disclosed in Japanese Patent Laid-open No. 39412/1985. The composite fiber is 5 denier in fineness and 12 mm long, with the aspect ratio being 550. The sea component is made of polyethylene having a melting point of 105° C. and the island component is made of polyethylene terephthalate having a melting point of 245° C. The basis weight of the first layer (of natural pulp) was 54 g/m², and the basis weight of the composite synthetic fibers alone in the second layer was 6 g/m².

Example 10

Agricultural paper of the present invention was produced in the sam same manner as in Example 9 except that the second layer was made from sheath-core type composite synthetic fibers incorporated with 50 wt. % of said NUKP. The composite fiber is 3 denier in fineness and 5 mm long, with the aspect ratio being 300. The sheath is made of polyethylene having a melting point of 165°–170° C. The basis weight of the first layer was 50 g/m², and the basis weight of the composite synthetic fibers alone in the second layer was 6 g/m².

Comparative Example 7

Single-layer agricultural paper having a basis weight of 60 g/m² was produced using the same wet papermaking machine as used in Example 8 from a paper stock composed of 82 wt. % of natural pulp as shown in Example 9 and 18 wt. % of polyolefin-type composite synthetic fibers as shown in Example 10. Drying and heating were carried out under the same conditions as in Example 8.

TABLE 5

| Performance | Example 9 | Example 10 | Comparative Example 7 |
|---|---|---|---|
| Strength after burying (kg/60 mm) | 1.41 | 1.38 | 0.38 |

It is noted from Table 5 that the agricultural paper of the invention is superior in paper strength to conventional paper made of a mixture of natural pulp and synthetic fiber as shown in Comparative Example 7. According to the present invention, the paper strength after burying is higher than 0.5 kg/60 mm which is required under ordinary conditions.

What is claimed is:

1. A process for producing agricultural paper which comprises forming a first wet layer having a basis weight of greater than 40 g/m² up to 60 g/m² from a paper stock consisting essentially of natural pulp, forming a second wet layer having a basis weight of 3–15 g/m² and consisting essentially of synthetic fibers, and joining at a joining interface the first wet layer with the second wet layer by a wet papermaking process, whereby the fibers of the first and second layers are intertwined at said joining interface.

2. A process for producing agricultural paper as claimed in claim 1, wherein the natural pulp has a beating degree (C.S.F.) in the range of 500–700 cc.

3. A process for producing agricultural paper as claimed in claim 1, wherein the synthetic fibers used for forming the second layer are one or more type of fibers selected from the group consisting of polyvinyl alcohol fibers, polypropylene fibers, polyethylene fibers, polyolefin fibers, polyester fibers, polyamise fibers, polyacrylonitrile fibers, and polyvinyl chloride fibers.

4. A process for producing agricultural paper as claimed in claim 1, wherein the synthetic fibers used for forming the second layer consist essentially of one or more type of fibers selected from the group consisting of polyvinyl alcohol fibers, polypropylene fibers, polyethylene fibers, polyolefin fibers, polyester fibers, polyamide fibers, polyacrylonitrile fibers, and polyvinyl chloride fibers, and (2) polyvinyl alcohol-based fibrous binder capable of bonding upon exposure to wet heat.

5. A process for producing agricultural paper as claimed in claim 1, wherein the thermoplastic synthetic fibers in of a fineness of greater than the second layer are 3 denier.

6. A process for producing agricultural paper which comprises the steps of forming a first wet layer from a paper stock consisting essentially of natural pulp, forming a second wet layer from an aqueous dispersion consisting essentially of composite synthetic fibers composed of polymers having different plasticizing temperatures, the polymer having the lowest plasticizing temperature of said polymers covering at least a part of the surface of synthetic fibers having higher plasticizing temperature, the basis weight of said synthetic fibers being 3–10 g/m², joining said first layer with said second layer at a joining interface by a wet papermaking process so that the total basis weight is 40–100 g/m², drying the joining layers, and heating said two layers at an intermediate temperature between the highest melting point and the lowest melting point of the polymer components of the synthetic fibers, whereby the polymer having the lowest plasticizing temperature bonds and fixes the thermoplastic fibers and also bonds and fixes the natural pulp which is intertwined with said thermoplastic fibers at said joining interface.

7. A process for producing agricultural paper which comprises the steps of forming a first wet layer from a paper stock consisting essentially of natural pulp, forming a second wet layer from an aqueous dispersion consisting essentially of (1) synthetic composite fibers composed of polymers having different plasticizing temperature, the polymer having the lowest plasticizing temperature of said polymers covering at least a part of the surfaces of synthetic fibers having higher plasticizing temperature, the basis weight of said synthetic fibers being 3-10 g/m², the thickness of said synthetic fibers being greater than 3 denier, and (2) natural pulp in an amount less than 300 wt. % based on said composite fibers, joining said first layer with said second layer at a joining interface by a wet paper-making process, so that the total basis weight is 40-100 g/m², drying the joining layers, and heating said two layers at an intermediate temperature between the highest melting point and the lowest melting point of the polymer components of the synthetic fibers, whereby the polymer having the lowest plasticizing temperature bonds and fixes the thermoplastic fibers and also bonds and fixes the natural pulp which is intertwined with said thermoplastic fibers at said joining interface.

8. A composite paper, said paper being an agricultural paper consisting essentially for a first layer of natural pulp having a basis weight of greater than 40 g/m² up to 60 g/m² and a second layer of synthetic fibers having a basis weight of 3-15 g/m², said first layer and second layer being joined to each other by a paper-making process, and intertwining structure being present at a joining interface in which the fibers of the two layers are intertwined.

9. Agricultural paper as claimed in claim 8, wherein the natural pulp has a beating degree (C.S.F.) in the range of 500-700 cc.

10. Agricultural paper as claimed in claim 8, wherein the synthetic fibers used in the second layer are one or more than one kind of fibers selected from the group consisting of polyvinyl alcohol fibers, polyproplylene fibers, polyethylene fibers, poloylefin fibers, polyester fibers, polyamide fibers, polyacrylonitrile fibers, and polyvinyl chloride fibers.

11. Agricultural paper as claimed in claim 8, wherein the synthetic fibers used in the second layer consist essentially of (1) one or more type of fibers selected from the group consisting of polyvinyl alcohol fibers, polypropylene fibers, polyethylene fibers polyolefin fibers, polyester fibers, polyamide fibers, polyacrylonitrile fibers, and polyvinyl chloride fibers, and a (2) polyvinyl alcohol-based fibrous binder capable of bonding upon exposure to a wet sheet upon heating.

12. A composite paper, said paper being an agricultural paper consisting essentially of a first layer of natural pulp and a second layer of composite synthetic fibers, said first layer and second layer being joined to each other by a paper-making process, an intertwining structure being present at a joining interface in which the fibers of the two layers are intertwined, said composite synthetic fibers being composed of (a) thermoplastic synthetic fibers and (b) a polymer having a plasticizing temperature lower than that of said thermoplastic fibers, said polymer being present on surfaces of said thermoplastic fibers and bonding and fixing said thermoplastic fibers and also bonding and fixing natural pulp intertwining with said thermoplastic fibers at the joining interface, the basis weight of said synthetic fibers in the second layer being 3-10 g/m² and the total basis weight of said first and second layers being 40-100 g/m².

13. Agricultural paper as claimed in claim 12, wherein the thermoplastic synthetic fibers and the polymer present on the surfaces of said thermoplastic synthetic fibers measure a fineness greater than 3 denier.

14. A composite paper, said paper being an agricultural paper consiting essentially of a first layer of natural pulp and a second layer of (1) composite synthetic fibers thicker than 3 denier and (2) natural pulp less than 300 wt. % based on said composite fibers, said first layer and second layer being joined to each other by a paper-making process, an intertwining structure being present at a joining interface in which the fibers of the two layers are intertwined, said composite fibers being composed of (a) thermosplastic synthetic fibers and (b) a polymer having a plasticizing temperature lower than that of said thermoplastic fibers, said polymer being present on the surface of said thermoplastic fibers and bonding and fixing said thermoplastic fibers and also bonding and fixing natural pulp intertwining with said thermoplastic fibers at the joining interface, the basis weight of said synthetic fibers in the second layer being 3-10 g/m² and the total basis weight of said first and second layers being 40-100 g/m².

* * * * *